United States Patent
Antapurkar et al.

(10) Patent No.: US 10,419,955 B1
(45) Date of Patent: Sep. 17, 2019

(54) APPARATUS AND METHODS FOR RADIO CHANNEL BACKGROUND SEARCH

(71) Applicant: QUALCOMM Incorporated, San Diego, CA (US)

(72) Inventors: Shwetal Kirtikumar Antapurkar, Yavatmal (IN); Srinivas Krovvidi, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/143,414

(22) Filed: Sep. 26, 2018

(51) Int. Cl.
- *H04W 4/00* (2018.01)
- *H04W 24/02* (2009.01)
- *H04W 64/00* (2009.01)
- *H04W 48/16* (2009.01)
- *H04W 88/08* (2009.01)

(52) U.S. Cl.
CPC .......... *H04W 24/02* (2013.01); *H04W 48/16* (2013.01); *H04W 64/00* (2013.01); *H04W 88/08* (2013.01)

(58) Field of Classification Search
CPC ..... H04W 24/02; H04W 64/00; H04W 48/16; H04W 88/08
USPC ........................................................ 455/434
See application file for complete search history.

(56) References Cited

U.S. PATENT DOCUMENTS

| | | | | |
|---|---|---|---|---|
| 5,345,597 A | * | 9/1994 | Strawczynski | H04W 36/06 455/450 |
| 2011/0111714 A1 | | 5/2011 | Balakrishnan et al. | |
| 2012/0252394 A1 | | 10/2012 | Balakrishnan et al. | |

* cited by examiner

*Primary Examiner* — Marcos Batista
(74) *Attorney, Agent, or Firm* — Muncy, Geissler, Olds & Lowe, P.C./Qualcomm

(57) ABSTRACT

Apparatus and methods for maintaining a valid radio channel list that may be updated dynamically without user intervention based on changes in the device location and the availability of an antenna are disclosed herein. For example, a device capable of performing a background low power search that initiates a new search based on changes in the geographic location of the device. This search may run based on the state of the radio and geographic location changes making sure the radio channels are updated in the background based on the geographic location with no user intervention required.

20 Claims, 5 Drawing Sheets

APPARATUS AND METHODS FOR RADIO CHANNEL BACKGROUND SEARCH

FIELD OF DISCLOSURE

This disclosure relates generally to radios and radio applications, and more specifically, but not exclusively, to background searches for radio stations.

BACKGROUND

This disclosure pertains to scannable wireless receivers generally that may scan different frequency bands, such as amplitude modulation (AM) and frequency modulation (FM) bands. Without limitation, the background is described in connection with FM receivers, but it should be understood that the disclosure pertains to other frequency bands as well. FM is popular in many developed countries and is growing in popularity in a number of developing countries. In the United States and Europe, FM broadcast stations use a bandwidth of 200 KHz assigned to them at different frequencies or positions within the 87.5 MHz to 108 MHz range. In Japan the FM band or available frequency spectrum is a 76 MHz to 90 MHz band. There, an FM channel can be centered at multiples of 50 KHz, with a frequency spacing of at least 200 KHz between any two valid stations. The FM center frequency can be centered at multiples of 50 KHz in some parts of the world and at multiples of 100 KHz in other parts of the world. Hence, scanning for FM bands at multiples of 50 KHz or multiples of 100 KHz are two useful operations. With the growing popularity of FM transmission all over the world, low-cost integrated FM receivers have become important to integrate into mobile handsets like cell phones and Internet devices as well as FM-supporting integrated circuits of various types for those and other products.

A radio receiver typically has a tuner with provisions for automatically searching across the frequency band and selecting the frequency of a transmitting station. Such a radio receiver may be integrated into a mobile device, such as a mobile phone, car, boat, plane, etc., and is of particular advantage in that it may provide for selection of broadcasting stations with a minimum distraction to the user of the mobile device for greater safety.

In cases using a FM radio application on a mobile device, the user expects FM channels to be ready when the user enters or launches the FM application. In mobile devices, when the user turns on the device and launches the radio application (or starts the ignition of a car, for example) with an available FM antenna, it is beneficial to keep the system updated with available FM channels even before the user initiates a scan. Typical FM search procedures are based on multiple algorithms such as Signal to Interference Noise ratio (SINR), for example, and the stations found in the search can vary based on the variable SINR including the position of the mobile device. Therefore, the user might need to keep scanning or searching again and again when the mobile device location changes. For example, a user at home might find very few channels when compared to open air like on a terrace of the home. Similarly in a car, when a user is in a city, the user can find more channels when compared to being in a rural environment. Thus, the valid FM channel list is dependent on the location of the phone/car and must be manually updated by the user, creating a problem.

What is needed is a device and process for maintaining a valid FM channel list that may be updated dynamically without customer intervention based on changes in the device location and the availability of an antenna. For example, a device capable of performing a background low power search that builds a close hysteresis and initiates a new search based on the geographic location. This search should run based on the state of the FM radio and available geographic location changes making sure the FM radio channels are updated in the background based on the geographic location with no user intervention required.

Accordingly, there is a need for systems, apparatus, and methods that overcome the deficiencies of conventional approaches including the methods, system and apparatus provided hereby.

SUMMARY

The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

In one aspect, a method includes: determining a first location of a mobile device; scanning a radio frequency band for a plurality of radio channels; determining if each of the plurality of radio channels exceeds an interference threshold; generating a first list of radio stations, the first list of radio stations comprises the plurality of radio channels determined to exceed the interference threshold; determining if a current location of the mobile device exceeds a distance threshold; if the current location of the mobile device exceeds the distance threshold: determine if each of the plurality of radio channels exceeds the interference threshold; and generate a second list of radio stations, the second list of radio stations comprises the plurality of radio channels determined to exceed the interference threshold.

In another aspect, a non-transitory computer-readable medium comprising instructions that when executed by a processor cause the processor to perform a method comprising: determining a first location of a mobile device; scanning a radio frequency band for a plurality of radio channels; determining if each of the plurality of radio channels exceeds an interference threshold; generating a first list of radio stations, the first list of radio stations comprises the plurality of radio channels determined to exceed the interference threshold; determining if a current location of the mobile device exceeds a distance threshold; if the current location of the mobile device exceeds the distance threshold: determine if each of the plurality of radio channels exceeds the interference threshold; and generate a second list of radio stations, the second list of radio stations comprises the plurality of radio channels determined to exceed the interference threshold.

In still another aspect, an apparatus comprises: an antenna; a radio tuner coupled to the antenna; a global positioning component configured to determine a position of the apparatus; a processor coupled to the global positioning component and the radio tuner, the processor configured to: determine a first location of the apparatus; scan a radio frequency band for a plurality of radio channels; determine if each of the plurality of radio channels exceeds an interference threshold; generate a first list of radio stations, the first list of radio stations comprises the plurality of radio channels determined to exceed the interference threshold; determine if a current location of the apparatus exceeds a distance threshold; if the current location of the apparatus exceeds the distance threshold: determine if each of the plurality of radio channels exceeds the interference threshold; and generate a second list of radio stations, the second list of radio stations comprises the plurality of radio channels determined to exceed the interference threshold.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

Figure 1:
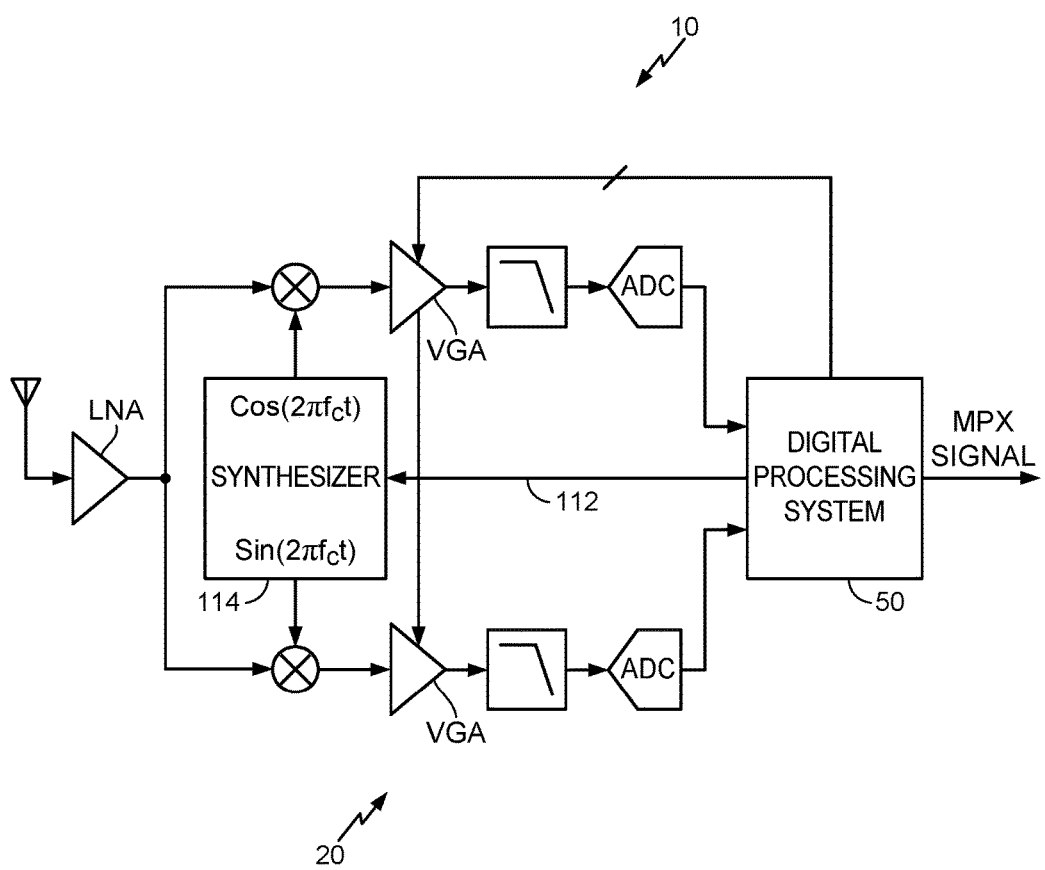
FIG. 1 illustrates an exemplary radio receiver in accordance with some examples of the disclosure.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

The exemplary methods, apparatus, and systems disclosed herein mitigate shortcomings of the conventional methods, apparatus, and systems, as well as other previously unidentified needs. For example, a device capable of performing a background low power search that builds a close hysteresis and initiates a new search based on the geographic location. This search may run based on the state of the FM radio and available geographic location changes making sure the FM radio channels are updated in the background based on the geographic location with no user intervention required. While the following is described with reference to FM receivers, it should be understood that the devices and methods described may apply to other frequency bands used by wireless receivers.

FIG. 1 illustrates an exemplary radio receiver in accordance with some examples of the disclosure. As shown in FIG. 1, an FM receiver 10 may have an RF front end 20 followed by a digital processing section 50. The digital processing section 50 may have an electronic processor 80 (including a storage circuitry, see FIG. 2) that configures, controls, and executes the illustrated process blocks in digital processing section 50. Digital processing section 50 may include a baseband section 200 (See FIG. 2). The digital processing section 50 has A) operations that control a frequency synthesizer 114 in RF front end 20 to tune to one or more channels pertaining to a frequency position in the band, as well as B) control operations in the baseband section 200 of FIG. 2 that are focused on channel and image filtering blocks just ahead of demodulation and can also utilize measurements that follow or are derived from demodulation. In the FM receiver 10, a frequency synthesizer is controlled to tune to one or more channels in the band and further control operations that involve channel and image filtering blocks in the baseband section 200 prior to demodulation (e.g., FM demod). Post-demodulation measurements are executed on a signal channel, and at least one more channel such as an image channel, and noise.

In FIG. 1, a scan of each FM station has circuits or process modules for (i) Synthesizer Tuning (ii) Automatic Gain Control (AGC) convergence (iii) I/Q Imbalance Estimation and (iv) measuring the metrics described elsewhere herein to determine a valid station or an invalid/empty channel. In one example, these might consume about 25 ms/channel leading to a band scan time of about 5 seconds. In FIG. 1, a low noise amplifier (LNA) amplifies signals from an antenna and feeds the amplified signals to quadrature down converters (X) for which the frequency synthesizer 114 provides quadrature local oscillator signals $\cos(2\pi f_{LO} t)$ and $\sin(2\pi f_{LO} t)$. A variable gain amplifier (VGA) for each quadrature path I, Q supplies an output to a low pass or band pass filter to recover a desired product of down conversion at an intermediate frequency (IF), after which is an analog to digital conversion (ADC) to provide digital signal inputs in quadrature to digital processing section 50. The digital processing section 50 feeds back respective automatic gain controls AGC to each VGA. Digital processing section 50 supplies an FM broadcast multiplex signal MPX at baseband and applies stereo decoding to deliver left and right channel stereo audio as its output, see FIGS. 1 and 2.

Figure 2:
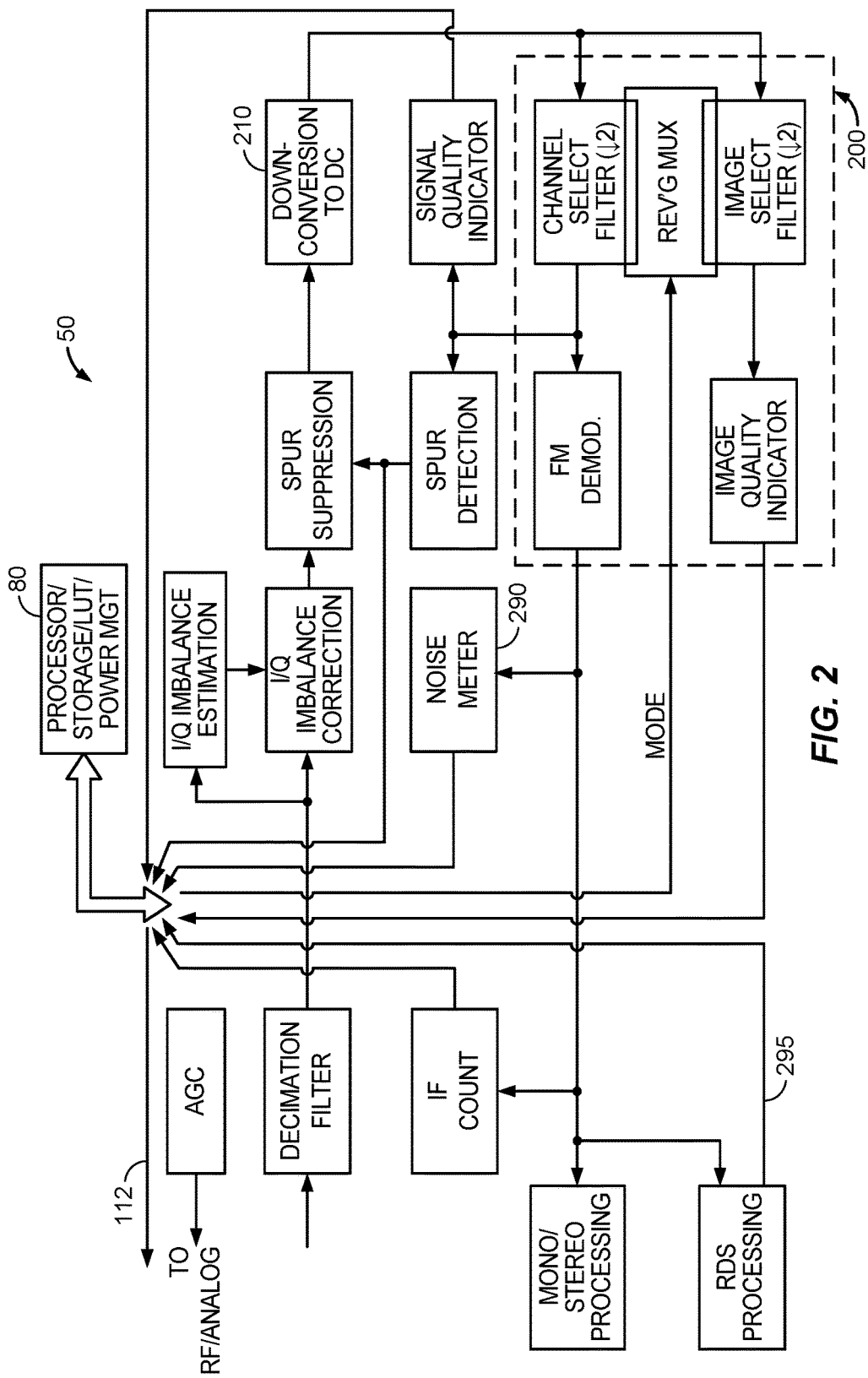
FIG. 2 illustrates an exemplary partial diagram of a radio receiver in accordance with some examples of the disclosure.

FIG. 2 illustrates an exemplary partial diagram of a radio receiver in accordance with some examples of the disclosure. As shown in FIG. 2, some examples provide all the digital blocks by the digital processing section 50 for the FM receiver that has an electronic processor 80 for down-conversion of modulated FM to baseband and also to demodulate and process resulting demodulated FM audio and RDS. An electronic instruction storage is included with the electronic processor 80 so that the electronic processor 80 operates in accordance with the instructions as taught here and stored in the storage. Stored instructions may be used for operations that are suitably implemented by such stored instructions such as the various blocks shown in FIG. 2 including decimation filters, AGC, RSSI, DC Offset, IQ Imbalance estimation and correction, spur suppression, down-conversion 210, baseband section 200 including filtering, spur detection, and FM demodulation. Further, such storage has blocks for downstream difference filtering, estimation and correction and IF count, and mono/stereo decoding from the radio signal, volume control thereof, and RDS processing.

In FIGS. 1 and 2, scanning for presence of a valid station or an invalid channel is determined by tuning to an FM channel, for instance, measuring various metrics, and checking if each of them satisfies a pre-defined criterion. Digital processing system 50 in FIGS. 1 and 2 supplies controls via a line 112 to frequency synthesizer 114 to control the tuning. This may also include measuring primary metrics Received Signal Strength Indicator (RSSI) (SQI and/or ISI Received Signal Strength Indicator) and IF Count (nominal center frequency of the in-band channel) that detects the existence of a signal, if the absolute value of the IF count is below a threshold value $\Delta f$ based on a maximum expected mismatch (e.g., +/−200 ppm or about 21.6 KHz) between frequencies of a remote transmitter and the receiver 10. If a decision determines that the RSSI and IF Count indicate the presence of a potential FM signal, then a secondary metrics for confirmation may be used and thereby further reduces the probability of false locks or avoids false locks entirely. Secondary metrics include any one, some or all of: a measure of the noise in the desired band herein called Noise Meter 290 in FIG. 2 and secondary metrics from a Spur Detector and Compression Detector inside the electronic processor 80 in FIG. 2.

For example, Noise Meter 290 electronically measures 15 KHz to 23 KHz noise energy, and has a product detector locked to a pilot, the product detector feeding a DC-rejecting, low-pass 4 KHz filter to obtain the noise, and the filter in turn feeding an energy-measuring process such as sum-of-squares (less average-squared) over time, to deliver a noise energy estimate. The spur detector can auto-correlate the signal to electronically detect its existence and energy, such as by determining the difference of auto-correlations at zero lag and at a larger lag (at which signal auto-correlation is low and spur auto-correlation is about the same as at zero lag), and thresholding the difference. The compression detector can detect existence of desired signal as indicated by interfering harmonic components less than a threshold, e.g., threshold of a difference magnitude between RSSI values of the signal obtained by setting the frequency synthesizer 114 to each of two frequencies somewhat offset from each other. Also, for some background on an IF count, a spur detector, a compression detector, and a noise detector, see the US Patent Application Publication 20110111714, "Method and System for False Frequency Lock Free Autonomous Scan in a Receiver" dated May 12, 2011 (TI-67295), which is hereby incorporated herein by reference.

Figure 3:
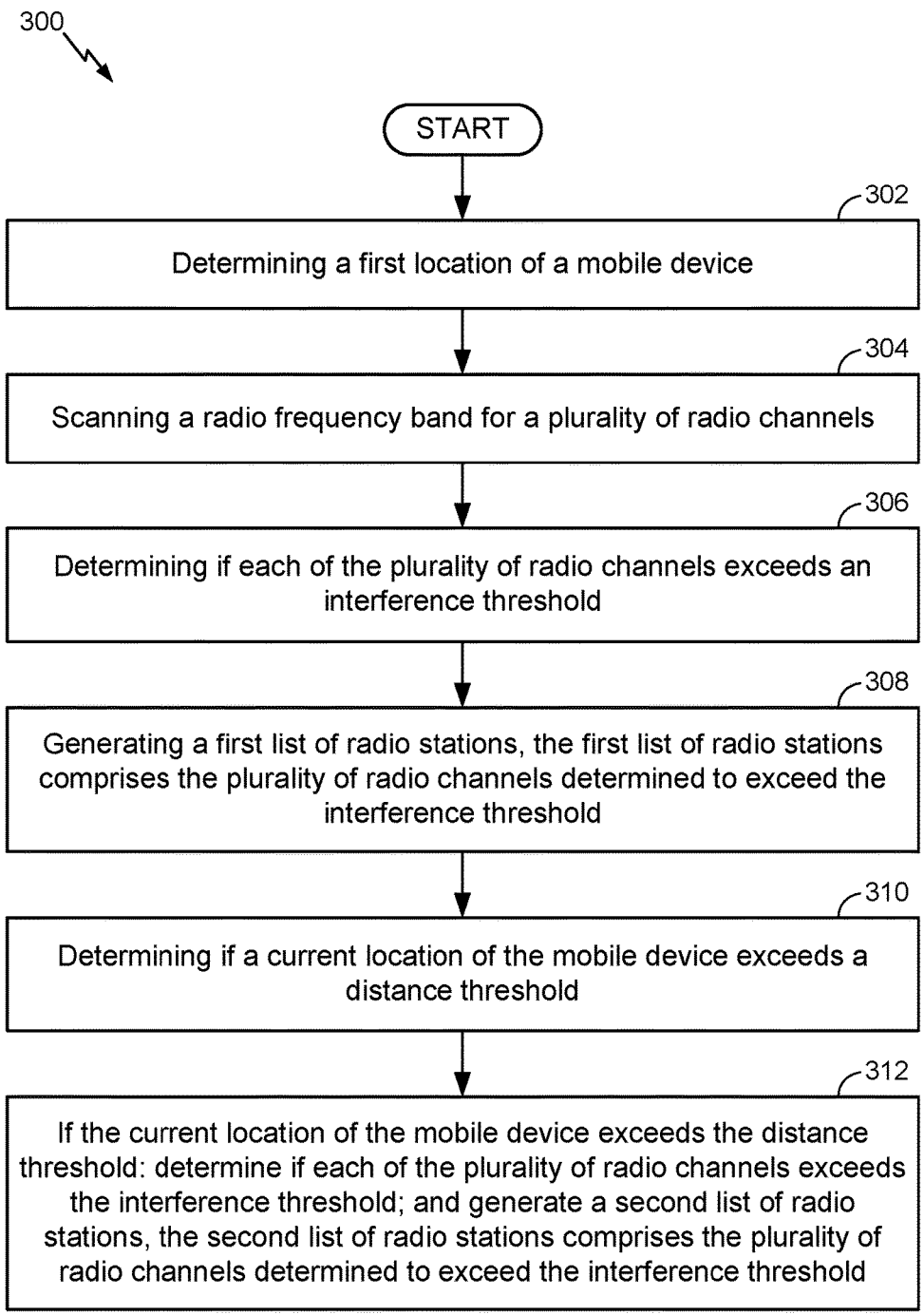
FIG. 3 illustrates an exemplary partial method for scanning a frequency band in accordance with some examples of the disclosure.

FIG. 3 illustrates an exemplary partial method for scanning a frequency band in accordance with some examples of the disclosure. As shown in FIG. 3, a partial method 300 may begin in block 302 with determining a first location of a mobile device. This may be accomplished with a global position system (GPS) component, such as GPS component 483 in FIG. 4. The partial method 300 continues in block 304 with scanning a radio frequency band for a plurality of radio channels. This may be accomplished with a radio tuner, such as radio tuner 481 of FIG. 4. The partial method 300 continues in block 306 with determining if each of the plurality of radio channels exceeds an interference threshold. This may be accomplished with software running on a processor, such as processor 401 in FIG. 4, or firmware (FW) configured appropriately. The partial method 300 continues in block 308 with generating a first list of radio stations, the first list of radio stations comprises the plurality of radio channels determined to exceed the interference threshold. The partial method 300 continues in block 310 with determining if a current location of the mobile device exceeds a distance threshold. If the current location exceeds the distance threshold, The partial method 300 continues in block 312 with determine if each of the plurality of radio channels exceeds the interference threshold and generate a second list of radio stations, the second list of radio stations comprises the plurality of radio channels determined to exceed the interference threshold. The partial method 300 may continue from block 302 until the mobile device, radio tuner, or scanning function is turned off or powered down. It should be understood that the interference threshold may be a signal to interference noise ratio indicating a radio channel has too much interference; the radio frequency band may be a FM band or a AM band; each of the plurality of radio channels may be at a pre-defined frequency; the distance threshold may be 60 km (for the FM band, for example) or lower, such as 20 km (for the AM band, for example), depending on the conditions, pre-set limits, or user defined limits.

While one exemplary method 300 is disclosed with reference to FIG. 3, it should be understood that additional methods are contemplated such as follows (note that some steps may be omitted or performed in a different order and HOST may refer to a component such as a processor or radio tuner):

Step 1: FM is started (State radio_off)
Step 2: FM in Idle state
Step 3: Tune to a station
Step 4: Station list will not be automatically populated
Step 5: User issues 'Scan all Stations' command
Step 6: Host sends the command to FW to search all the available stations
Step 7: FW runs a search algorithm based on SINR
Step 8: Search algorithm compares every station SINR with the SINR threshold and decide every station as Good (SINR>SINR_threshold) or bad channel
Step 9: Station list is populated and Command complete sent to the HOST.

Another partial method may include (note that some steps may be omitted or performed in a different order and HOST may refer to a component such as a processor or radio tuner):

Step 1: FM is started (State: FM Radio_off)
Step 2: FM in Idle state
Step 3: FM enters in Searching state
Step 4: FW runs a 'Search algorithm based on SINR', as well as takes input from the GPS module (this will indicate the geographic location of the phone/car) and populates the Station list
Step 4: FM tunes to a station
Step 5: Whenever the user location is outside a pre-defined range, it will interrupt the FW. This range is pre-decided by the GPS co-ordinates
Step 6: FW runs a search algorithm again and updates the Station list.

It should be noted that for FM signal coverage: The FM signal reception is strong usually up to 50 to 60 Kms. The FM search algorithm may monitor the present station signal strength based upon SINR/Received Signal Strength Indicator (RSSI). In addition, the FM search algorithm may also take input from the GPS module as well, such as indicating that the antenna has moved outside a range of 50 kms to 60 Kms. Hence the search algorithm will be more robust and the FM search performance will improve.

Figure 4:
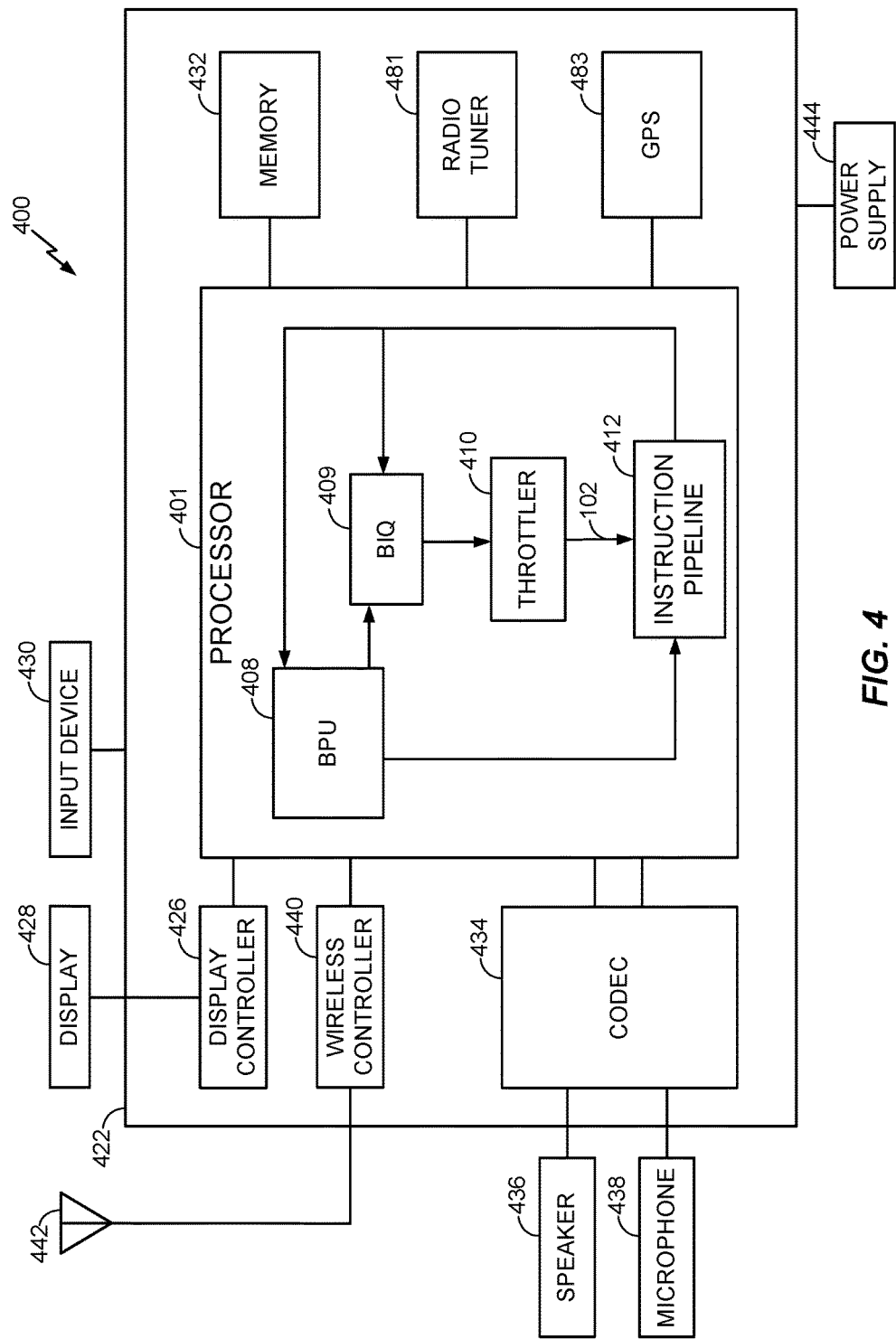
FIG. 4 illustrates an exemplary mobile device in accordance with some examples of the disclosure.

FIG. 4 illustrates an exemplary mobile device in accordance with some examples of the disclosure. Referring now to FIG. 4, a block diagram of a mobile device that is configured according to exemplary aspects is depicted and generally designated 400. In some aspects, mobile device 400 may be configured as a wireless communication device. As shown, mobile device 400 includes processor 401, which may be configured to implement the methods described herein in some aspects. Processor 401 is shown to comprise instruction pipeline 412, buffer processing unit (BPU) 408, branch instruction queue (BIQ) 404, and throttler 410 as is well known in the art. Other well-known details (e.g., counters, entries, confidence fields, weighted sum, comparator, etc.) of these blocks have been omitted from this view of processor 401 for the sake of clarity.

Processor 401 may be communicatively coupled to memory 432 over a link, which may be a die-to-die or chip-to-chip link. Mobile device 400 also include display 428 and display controller 426, with display controller 426 coupled to processor 401 and to display 428. Mobile device 400 may also include a radio tuner 481 configured to scan and tune to radio stations, such as in the FM or AM frequency band and a GPS component 483 configured to receive and process GPS signals. The radio tuner 481 and GPS component 483 may be coupled to the processor 401 and configured to perform any of the processes described herein including the method describe in FIG. 3 (e.g., method 300) and the accompanying text.

In some aspects, FIG. 4 may include coder/decoder (CODEC) 434 (e.g., an audio and/or voice CODEC) coupled to processor 401; speaker 436 and microphone 438 coupled to CODEC 434; and wireless controller 440 (which may include a modem) coupled to wireless antenna 442 and to processor 401.

In a particular aspect, where one or more of the above-mentioned blocks are present, processor 401, display controller 426, memory 432, CODEC 434, and wireless controller 440 can be included in a system-in-package or system-on-chip device 422. Input device 430 (e.g., physical or virtual keyboard), power supply 444 (e.g., battery), display 428, input device 430, speaker 436, microphone 438, wireless antenna 442, and power supply 444 may be external to system-on-chip device 422 and may be coupled to a component of system-on-chip device 422, such as an interface or a controller.

It should be noted that although FIG. 4 depicts a mobile device, processor 401 and memory 432 may also be integrated into a set top box, a music player, a video player, an entertainment unit, a navigation device, a personal digital assistant (PDA), a fixed location data unit, a computer, a laptop, a tablet, a communications device, a mobile phone, or other similar devices.

Figure 5:
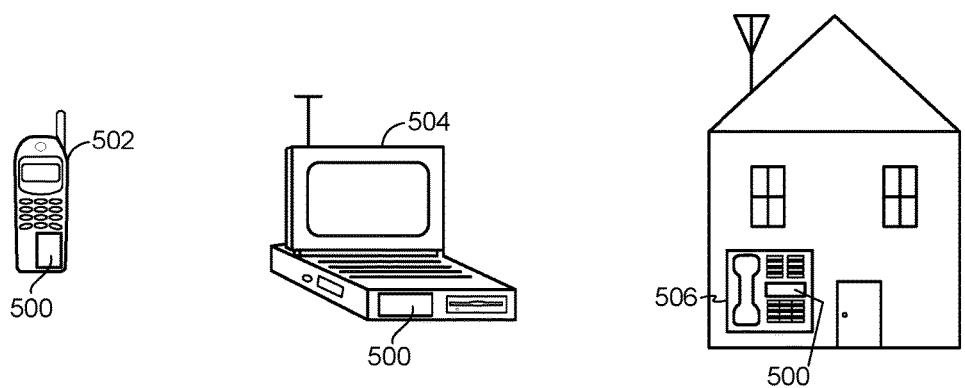
FIG. 5 illustrates various electronic devices that may be integrated with any of the aforementioned integrated device, semiconductor device, integrated circuit, die, interposer, package or package-on-package (PoP) in accordance with some examples of the disclosure.

FIG. 5 illustrates various electronic devices that may be integrated with any of the aforementioned integrated device, semiconductor device, integrated circuit, die, interposer, package or package-on-package (PoP) in accordance with some examples of the disclosure. For example, a mobile phone device 502, a laptop computer device 504, and a fixed location terminal device 506 may include an integrated device 500 as described herein. The integrated device 500 may be, for example, any of the integrated circuits, dies, integrated devices, integrated device packages, integrated circuit devices, device packages, integrated circuit (IC) packages, package-on-package devices described herein. The devices 502, 504, 506 illustrated in FIG. 5 are merely exemplary. Other electronic devices may also feature the integrated device 500 including, but not limited to, a group of devices (e.g., electronic devices) that includes mobile devices, hand-held personal communication systems (PCS) units, portable data units such as personal digital assistants, global positioning system (GPS) enabled devices, navigation devices, set top boxes, music players, video players, entertainment units, fixed location data units such as meter reading equipment, communications devices, smartphones, tablet computers, computers, wearable devices, servers, routers, electronic devices implemented in automotive vehicles (e.g., autonomous vehicles), or any other device that stores or retrieves data or computer instructions, or any combination thereof.

It will be appreciated that various aspects disclosed herein can be described as functional equivalents to the structures, materials and/or devices described and/or recognized by those skilled in the art. For example, in one aspect, an apparatus may comprise a means for processing (see, e.g., 401 in FIG. 4), a means for scanning a frequency band for radio channels (e.g., radio tuner 481 in FIG. 4), and a means for determining a position (e.g., GPS component 483 in FIG. 4) coupled to the means for processing. It will be appreciated that the aforementioned aspects are merely provided as examples and the various aspects claimed are not limited to the specific references and/or illustrations cited as examples.

One or more of the components, processes, features, and/or functions illustrated in FIGS. 1-5 may be rearranged and/or combined into a single component, process, feature or function or incorporated in several components, processes, or functions. Additional elements, components, processes, and/or functions may also be added without departing from the disclosure. It should also be noted that FIGS. 1-5 and its corresponding description in the present disclosure is not limited to dies and/or ICs. In some implementations, FIGS. 1-5 and its corresponding description may be used to manufacture, create, provide, and/or produce integrated devices. In some implementations, a device may include a die, an integrated device, a die package, an integrated circuit (IC), a device package, an integrated circuit (IC) package, a wafer, a semiconductor device, a package on package (PoP) device, and/or an interposer.

In this description, certain terminology is used to describe certain features. The term "mobile device" can describe, and is not limited to, a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, an automotive device in an automotive vehicle, and/or other types of portable electronic devices typically carried by a person and/or having communication capabilities (e.g., wireless, cellular, infrared, short-range radio, etc.). Further, the terms "user equipment" (UE), "mobile terminal," "mobile device," and "wireless device," can be interchangeable.

The wireless communication between electronic devices can be based on different technologies, such as code division multiple access (CDMA), W-CDMA, time division multiple access (TDMA), frequency division multiple access (FDMA), Orthogonal Frequency Division Multiplexing (OFDM), Global System for Mobile Communications (GSM), 3GPP Long Term Evolution (LTE), Bluetooth (BT), Bluetooth Low Energy (BLE) or other protocols that may be used in a wireless communications network or a data communications network. Bluetooth Low Energy (also known as Bluetooth LE, BLE, and Bluetooth Smart) is a wireless personal area network technology designed and marketed by the Bluetooth Special Interest Group intended to provide considerably reduced power consumption and cost while maintaining a similar communication range. BLE was merged into the main Bluetooth standard in 2010 with the adoption of the Bluetooth Core Specification Version 4.0 and updated in Bluetooth 5 (both expressly incorporated herein in their entirety).

The word "exemplary" is used herein to mean "serving as an example, instance, or illustration." Any details described herein as "exemplary" is not to be construed as advantageous over other examples. Likewise, the term "examples" does not mean that all examples include the discussed feature, advantage or mode of operation. Furthermore, a particular feature and/or structure can be combined with one or more other features and/or structures. Moreover, at least a portion of the apparatus described hereby can be configured to perform at least a portion of a method described hereby.

The terminology used herein is for the purpose of describing particular examples and is not intended to be limiting of examples of the disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, actions, operations, elements, and/or components, but do not preclude the presence or addition of one or more other features, integers, actions, operations, elements, components, and/or groups thereof.

It should be noted that the terms "connected," "coupled," or any variant thereof, mean any connection or coupling, either direct or indirect, between elements, and can encompass a presence of an intermediate element between two elements that are "connected" or "coupled" together via the intermediate element.

Any reference herein to an element using a designation such as "first," "second," and so forth does not limit the quantity and/or order of those elements. Rather, these designations are used as a convenient method of distinguishing between two or more elements and/or instances of an element. Also, unless stated otherwise, a set of elements can comprise one or more elements.

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be incorporated entirely within any form of computer-readable storage medium having stored therein a corresponding set of computer instructions that upon execution would cause an associated processor to perform the functionality described herein. Thus, the various aspects of the disclosure may be incorporated in a number of different forms, all of which have been contemplated to be within the scope of the claimed subject matter. In addition, for each of the examples described herein, the corresponding form of any such examples may be described herein as, for example, "logic configured to" perform the described action.

Nothing stated or illustrated depicted in this application is intended to dedicate any component, action, feature, benefit, advantage, or equivalent to the public, regardless of whether the component, action, feature, benefit, advantage, or the equivalent is recited in the claims.

Further, those of skill in the art will appreciate that the various illustrative logical blocks, modules, circuits, and algorithm actions described in connection with the examples disclosed herein may be implemented as electronic hardware, computer software, or combinations of both. To clearly illustrate this interchangeability of hardware and software, various illustrative components, blocks, modules, circuits, and actions have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the examples disclosed herein may be incorporated directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art including non-transitory types of memory or storage mediums. An exemplary storage medium is coupled to the processor such that the processor can read information from, and write information to, the storage medium. In the alternative, the storage medium may be integral to the processor.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

Although some aspects have been described in connection with a device, it goes without saying that these aspects also constitute a description of the corresponding method, and so a block or a component of a device should also be understood as a corresponding method action or as a feature of a method action. Analogously thereto, aspects described in connection with or as a method action also constitute a description of a corresponding block or detail or feature of a corresponding device. Some or all of the method actions can be performed by a hardware apparatus (or using a hardware apparatus), such as, for example, a microprocessor, a programmable computer or an electronic circuit. In some examples, some or a plurality of the most important method actions can be performed by such an apparatus.

In the detailed description above it can be seen that different features are grouped together in examples. This manner of disclosure should not be understood as an intention that the claimed examples have more features than are explicitly mentioned in the respective claim. Rather, the disclosure may include fewer than all features of an individual example disclosed. Therefore, the following claims should hereby be deemed to be incorporated in the description, wherein each claim by itself can stand as a separate example. Although each claim by itself can stand as a separate example, it should be noted that—although a dependent claim can refer in the claims to a specific combination with one or a plurality of claims—other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

It should furthermore be noted that methods, systems, and apparatus disclosed in the description or in the claims can be implemented by a device comprising means for performing the respective actions of this method.

Furthermore, in some examples, an individual action can be subdivided into a plurality of sub-actions or contain a plurality of sub-actions. Such sub-actions can be contained in the disclosure of the individual action and be part of the disclosure of the individual action.

While the foregoing disclosure shows illustrative examples of the disclosure, it should be noted that various changes and modifications could be made herein without departing from the scope of the disclosure as defined by the appended claims. The functions and/or actions of the method claims in accordance with the examples of the disclosure described herein need not be performed in any particular order. Additionally, well-known elements will not be described in detail or may be omitted so as to not obscure the relevant details of the aspects and examples disclosed herein. Furthermore, although elements of the disclosure may be described or claimed in the singular, the plural is contemplated unless limitation to the singular is explicitly stated.

What is claimed is:

1. A method for scanning a frequency band, the method comprising:
    determining a first location of a mobile device;
    scanning a radio frequency band for a plurality of radio channels;
    determining if each of the plurality of radio channels exceeds an interference threshold;
    generating a first list of radio stations, the first list of radio stations comprises the plurality of radio channels determined to exceed the interference threshold;
    determining if a current location of the mobile device exceeds a distance threshold;
    if the current location of the mobile device exceeds the distance threshold:
    determine if each of the plurality of radio channels exceeds the interference threshold; and
    generate a second list of radio stations, the second list of radio stations comprises the plurality of radio channels determined to exceed the interference threshold.

2. The method of claim 1, wherein the interference threshold is a signal to interference noise ratio indicating a radio channel has too much interference.

3. The method of claim 1, wherein the radio frequency band is a FM band.

4. The method of claim 1, wherein the radio frequency band is an AM band.

5. The method of claim 1, wherein each of the plurality of radio channels is at a pre-defined frequency.

6. The method of claim 1, wherein the distance threshold is 60 km.

7. The method of claim 1, wherein the method is performed by a device selected from the group consisting of a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, and a device in an automotive vehicle.

8. A non-transitory computer-readable medium comprising instructions that when executed by a processor cause the processor to perform a method comprising:
    determining a first location of a mobile device;
    scanning a radio frequency band for a plurality of radio channels;
    determining if each of the plurality of radio channels exceeds an interference threshold;
    generating a first list of radio stations, the first list of radio stations comprises the plurality of radio channels determined to exceed the interference threshold;
    determining if a current location of the mobile device exceeds a distance threshold;
    if the current location of the mobile device exceeds the distance threshold:
    determine if each of the plurality of radio channels exceeds the interference threshold; and
    generate a second list of radio stations, the second list of radio stations comprises the plurality of radio channels determined to exceed the interference threshold.

9. The non-transitory computer-readable medium of claim 8, wherein the interference threshold is a signal to interference noise ratio indicating a radio channel has too much interference.

10. The non-transitory computer-readable medium of claim 8, wherein the radio frequency band is a FM band.

11. The non-transitory computer-readable medium of claim 8, wherein the radio frequency band is an AM band.

12. The non-transitory computer-readable medium of claim 8, wherein each of the plurality of radio channels is at a pre-defined frequency.

13. The non-transitory computer-readable medium of claim 8, wherein the distance threshold is 60 km.

14. An apparatus comprising:
    an antenna;
    a radio tuner coupled to the antenna;
    a global positioning component configured to determine a position of the apparatus;
    a processor coupled to the global positioning component and the radio tuner, the processor configured to:
        determine a first location of the apparatus;
        scan a radio frequency band for a plurality of radio channels;
        determine if each of the plurality of radio channels exceeds an interference threshold;
        generate a first list of radio stations, the first list of radio stations comprises the plurality of radio channels determined to exceed the interference threshold;
        determine if a current location of the apparatus exceeds a distance threshold;
        if the current location of the apparatus exceeds the distance threshold:
        determine if each of the plurality of radio channels exceeds the interference threshold; and
        generate a second list of radio stations, the second list of radio stations comprises the plurality of radio channels determined to exceed the interference threshold.

15. The apparatus of claim 14, wherein the interference threshold is a signal to interference noise ratio indicating a radio channel has too much interference.

16. The apparatus of claim 14, wherein the radio frequency band is a FM band.

17. The apparatus of claim 14, wherein the radio frequency band is an AM band.

18. The apparatus of claim 14, wherein each of the plurality of radio channels is at a pre-defined frequency.

19. The apparatus of claim 14, wherein the distance threshold is 60 km.

20. The apparatus of claim 14, wherein the apparatus is integrated into a device selected from the group consisting of a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, and a device in an automotive vehicle.

\* \* \* \* \*